United States Patent
Nemes et al.

(10) Patent No.: US 11,004,169 B2
(45) Date of Patent: May 11, 2021

(54) NEURAL NETWORK WATERMARKING

(71) Applicant: Nokia Technologies Oy, Espoo (FI)

(72) Inventors: Csaba Nemes, Dunakeszi (HU); Sándor Jordán, Sződ (HU)

(73) Assignee: Nokia Technologies Oy, Espoo (FI)

( * ) Notice: Subject to any disclaimer, the term of this patent is extended or adjusted under 35 U.S.C. 154(b) by 68 days.

(21) Appl. No.: 16/553,098

(22) Filed: Aug. 27, 2019

(65) Prior Publication Data

US 2020/0074581 A1    Mar. 5, 2020

Related U.S. Application Data

(60) Provisional application No. 62/726,917, filed on Sep. 4, 2018, provisional application No. 62/724,563, filed on Aug. 29, 2018.

(51) Int. Cl.
| | |
|---|---|
| *G06T 1/00* | (2006.01) |
| *H04N 1/32* | (2006.01) |
| *G06N 3/08* | (2006.01) |
| *G06N 3/04* | (2006.01) |

(52) U.S. Cl.
CPC .............. *G06T 1/005* (2013.01); *G06N 3/04* (2013.01); *G06N 3/08* (2013.01); *H04N 1/3232* (2013.01)

(58) Field of Classification Search
CPC ........ G06T 1/005; H04N 1/3232; G06N 3/08; G06N 3/04; G06N 3/0481; G06F 21/16
See application file for complete search history.

(56) References Cited

U.S. PATENT DOCUMENTS

| | | |
|---|---|---|
| 2005/0025337 A1 | 2/2005 | Lu et al. |
| 2017/0206449 A1 | 7/2017 | Lain |
| 2018/0336702 A1 | 11/2018 | Cricri et al. |

OTHER PUBLICATIONS

Rouhani et al., "DeepSigns: A Generic Watermarking Framework for Protecting the Ownership of Deep Learning Models", arXiv, May 31, 2018, 13 pages.
Uchida et al., "Embedding Watermarks into Deep Neural Networks", arXiv, Apr. 20, 2017, pp. 1-10.
Bhattacharya et al., "A Distortion Free Watermark Framework for Relational Databases", Proceedings of the 4th International Conference on Software and Data Technologies (ICSOFT), 2009, 6 pages.
Zhang et al., "Protecting Intellectual Property of Deep Neural Networks with Watermarking", Proceedings of the 2018 on Asia Conference on Computer and Communications Security (ASIACCS), Jun. 4-8, 2018, pp. 159-171.

(Continued)

*Primary Examiner* — Christopher Wait
(74) *Attorney, Agent, or Firm* — Nokia Technologies Oy

(57) ABSTRACT

Methods and apparatus, including computer program products, are provided for watermarking neural networks. In some embodiments, there may be provided a method. The method may include determining, for a neural network, an activation layer output by a hidden layer of the neural network. The method may include selecting a watermarking process. The method may include applying the selected watermarking process to the activation layer output to generate a key. The method may include storing, for the neural network to enable detection of copying of the neural network, the selected watermarking process and the key. Related systems, methods, and articles of manufacture are also described.

20 Claims, 11 Drawing Sheets

(56) References Cited

OTHER PUBLICATIONS

Nagai et al., "Digital Watermarking for Deep Neural Networks", arXiv, Feb. 6, 2018, pp. 1-14.
Chen et al., "DeepMarks: A Digital Fingerprinting Framework for Deep Neural Networks", arXiv, Apr. 10, 2018, 12 pages.
"Protecting the Intellectual Property of AI with Watermarking", IBM, Retrieved on Aug. 22, 2019, Webpage available at : https://www.ibm.com/blogs/research/2018/07/ai-watermarking/.
U.S. Appl. No. 62/697,114, "Watermark Embedding Techniques for Neural Networks and Their Use", filed Jul. 12, 2018, 95 pages.
Goubin et al., "How to Reveal the Secrets of an Obscure White-Box Implementation", Journal of Cryptographic Engineering, 2018, pp. 1-22.
Quiring et al., "Forgotten Siblings: Unifying Attacks on Machine Learning and Digital Watermarking", IEEE European Symposium on Security and Privacy (EuroS&P), 2018, 15 pages.
Hanzlick et al., "MLCapsule: Guarded Offline Deployment of Machine Learning as a Service", arXiv, 2018, 14 pages.
Merrer et al., "Adversarial Frontier Stitching for Remote Neural Network Watermarking", arXiv, Aug. 7, 2019, pp. 1-12.
Adi et al., "Turning Your Weakness Into a Strength: Watermarking Deep Neural Networks by Backdooring", arXiv, Jun. 11, 2018, 17 pages.
Grosse et al., "On the (Statistical) Detection of Adversarial Examples", arXiv, Oct. 17, 2017, 13 pages.
Rouhani et al., "Safe Machine Learning and Defeating Adversarial Attacks", IEEE Security and Privacy (S&P) Magazine, 2018, pp. 1-7.
Rouhani et al., "DeepFense: Online Accelerated Defense Against Adversarial Deep Learning", IEEE/ACM International Conference on Computer-Aided Design (ICCAD), 2018, 8 pages.
Goodfellow et al., "Explaining and Harnessing Adversarial Examples", arXiv, Mar. 20, 2015, pp. 1-11.
Papernot et al., "Practical Black-Box Attacks against Machine Learning", Proceedings of ACM on Asia Conference on Computer and Communications Security, 2017, pp. 506-519.

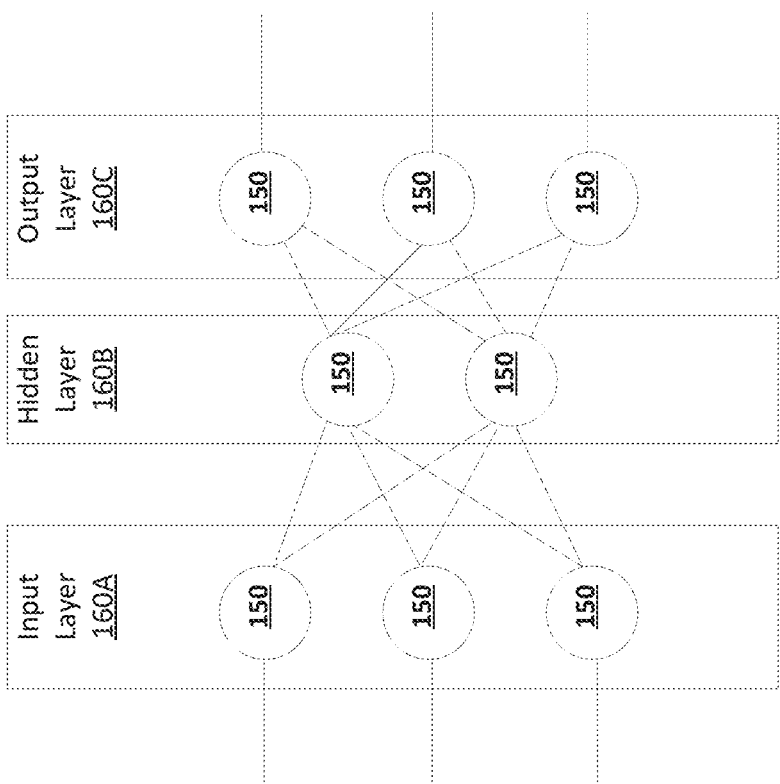

Generate a trigger $image_i$ for each $neuron_i$ of the hidden layer so the following is satisfied:
$$p_i \approx 1$$
$$p_{i \neq j} \approx 0$$
$\forall i, j \in \{neuron\_indeces\}$
302

Save a trigger images
304

FIG. 3A

Determine an output of a hidden layer $\bar{p}$ based on input $$\overline{p_{swap}} := f_{network}(input, \overline{W swap})$$
330

Reorder elements of $\overline{p_{swap}}$ according to order provided by the plurality of trigger images

332

Apply watermarking technique on re-order hidden layer output $\bar{p}$ to obtain key $k^{re\text{-}ordered}$ $$k^{re\text{-}ordered} = f_{watermark}(\overline{p_{reordered}}, \theta)$$
334

Compare $k$ to $k^{re\text{-}prdered}$

NEURAL NETWORK WATERMARKING

RELATED APPLICATIONS

This application claims priority to U.S. Provisional Application No. 62/724,563, filed on Aug. 29, 2018, entitled "Neural Network Watermarking," and U.S. Provisional Application No. 62/726,917, filed on Sep. 4, 2018, entitled "Neural Network Watermarking," the contents of both applications are incorporated herein by reference in its entirety.

FIELD

The subject matter described herein relates to machine learning.

BACKGROUND

Machine learning technology, such as neural networks, deep learning neural networks, and/or the like, may learn to perform a task, such as classification, detection, and/or a variety of other tasks. For example, a neural network may learn to detect, from input images, whether a certain image is present in the image. The neural network may learn in a supervised or unsupervised manner to perform a task. Neural networks are being deployed in a variety of settings including cloud servers coupled to the Internet, user equipment such as smartphones, tablets, computers, and/or the like, as well as in a variety of other devices.

SUMMARY

In some embodiments, there may be provided a method. The method may include determining, for a neural network, an activation layer output by a hidden layer of the neural network. The method may include selecting a watermarking process. The method may include applying the selected watermarking process to the activation layer output to generate a key. The method may include storing, for the neural network to enable detection of copying of the neural network, the selected watermarking process and the key.

In some variations, one or more of the features disclosed herein including the following features can optionally be included in any feasible combination. The method may include generating, for the neural network, a trigger image for each node of the hidden layer of the neural network. The method may include storing, for the neural network to enable detection of copying of the neural network, the trigger image for each node of the hidden layer of the neural network. The method may include determining, for a candidate neural network being evaluated for copying, another activation layer output of a corresponding hidden layer of the candidate neural network. The method may include reordering each node of the corresponding hidden layer of the candidate network, and the reordering may be based on the stored trigger image for each node of the hidden layer of the neural network. A first hidden layer node of the neural network may be associated with a first trigger image that causes a maximum activation output at the first hidden layer node but not other nodes of the hidden layer, the reorder based on the maximum activation output. The method may include applying the stored, selected watermarking process to the other activation layer output of the corresponding hidden layer of the candidate neural network to generate a candidate key. The method may include comparing the key to the candidate key; indicating, based on the comparing, the candidate neural network is a copy, when the key and the candidate key match; and indicating, based on the comparing, the candidate neural network is not a copy, when the key and the candidate key do not match. The candidate neural network is an altered copy of the neural network, the altered copy including reordered hidden layer nodes and/or noise added to the hidden layer nodes. The selected watermarking process may include a random projection. In some other variations, the method may include generating, for the neural network, one or more trigger images for one or more nodes of one or more hidden layers of the neural network. The method may include storing, for the neural network to enable detection of copying of the neural network, the one or more trigger images for the one or more nodes of the one or more hidden layers of the neural network. The method may include determining, for a candidate neural network being evaluated for copying, another activation layer output of a corresponding hidden layer of the candidate neural network. The method may include reordering the one or more nodes of the corresponding one or more hidden layers of the candidate network, and the reordering may be based on the one or more stored trigger images for the one or more nodes of the one or more hidden layers of the neural network. A first hidden layer node of the neural network may be associated with a first trigger image that causes a maximum activation output at the first hidden layer node but not other nodes of the hidden layer, the reorder based on the maximum activation output.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 1B depicts an example of a neural network including at least one neuron, in accordance with some example embodiments;

FIG. 3A depicts an example of a process for generating trigger images, in accordance with some example embodiments;

FIG. 3E depicts an example of a process for detecting a watermark based on trigger images, in accordance with some example embodiments;

Figure 1A:
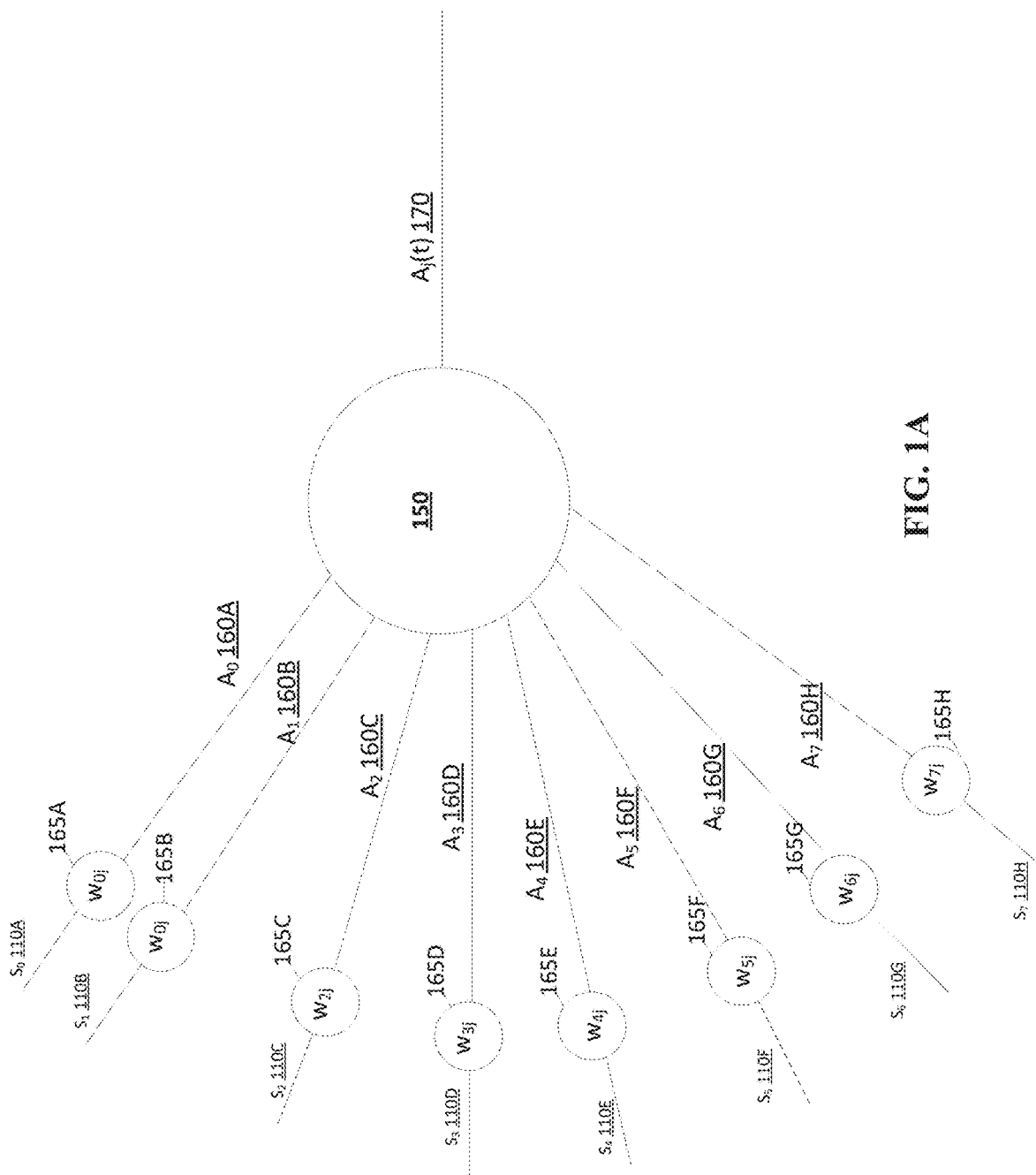
FIG. 1A depicts an example of a neuron for a neural network, in accordance with some example embodiments.

Like labels are used to refer to same or similar items in the drawings.

DETAILED DESCRIPTION

Machine learning including neural networks and deep learning neural networks are continuing to evolve and become more commonplace due, in part, to the ability of machine learning to detect patterns and/or perform other tasks. As machine learning is deployed to devices, detection of unauthorized copying (e.g., a hack) of the neural network may be a challenge. For example, when a neural network is deployed in a server, a user equipment, and/or other types of devices, the neural network may be copied by another party, such as a hacker not authorized to copy the neural network. This hacker may then use the copied neural network.

Often, a hacker may attempt to avoid detection of the copying by modifying the neural network. To illustrate, the hacker may modify one or more of the hidden layer nodes of the neural network to avoid the copying from being detected. For example, the hacker may re-arrange the order of the one or more hidden layer nodes. The hacker may also add a certain amount of noise, such as random noise, Gaussian noise, and/or the like, to the hidden layer node to alter slightly the exact values of the re-arranged hidden layer nodes. By changing the order of the hidden layer nodes and/or adding noise, the hacker may avoid, or reduce the likelihood of, detection. Although watermarking has been used in the past to detect copying of neural networks, traditional watermarking has not been able to detect more sophisticated copying techniques, which re-arrange the order of a hidden layer node.

In some example embodiments, a watermark may be generated to detect copying of a neural network. In some example embodiments, the generated watermark may detect a copied neural network having at least one hidden layer node re-arranged with respect to order. This detection may take place even when the re-arranged hidden layer has been modified by the addition of some noise.

Before providing additional description with respect to watermarking, the following provides a description related to machine learning and, more specifically, neural networks.

FIG. 1A depicts an example of an artificial neuron Aj 150 which may be implemented in a neural network, in accordance with some example embodiments. The neuron 150 may be connected to form a neural network 199, as described with respect to FIG. 1B below.

Referring to FIG. 1A, the neuron 150 may generate an output $A_j(t)$ 170 based on activation values $A_i(t-1)$ (which correspond to $A_0$-$A_7$) 160A-H, connection weights $w_{ij}$ 165A-H (also referred to as "weights" which are labeled $w_{oj}$ through $w_{7j}$), and input values 110A-H (labeled $S_0$-$S_7$). At a given time, t, each one of the activation values 160A-H may be multiplied by one of the corresponding weights 165A-H. For example, connection weight $w_{oj}$ 165A is multiplied by activation value $A_0$ 160A, connection weight $w_{1j}$ 165B is multiplied by activation value $A_1$ 160B, and so forth. The products (i.e., of the multiplications of the connections and activation values) are then summed, and the resulting sum is operated on by a basis function K to yield at time t the output $A_j(t)$ 170 for node $A_j$ 150. The outputs 170 may be used as an activation value at a subsequent time (e.g., at t+1) or provided to another node.

The neuron 150 may be implemented in accordance with a neural model such as:

$$A_j(t) = K\left[\sum_{i=0}^{n} A_i(t-1) * W_{ij}\right],$$ Equation 1 wherein K corresponds to a basis function (examples of which include a sigmoid, a wavelet, and any other basis function), $A_j(t)$ corresponds to an output value provided by a given neuron (e.g., the $j^{th}$ neuron) at a given time t, $A_i(t-1)$ corresponds to a prior output value (or activation value) assigned to a connection i for the $j^{th}$ neuron at a previous time t-1, $w_{ij}$ represents the $i^{th}$ connection value for the $j^{th}$ neuron, wherein j varies in accordance with the quantity of neurons, wherein the values of i vary from 0 to n, and wherein n corresponds to the number of connections to the neuron.

It will be appreciated that FIG. 1A represents a model of the neuron 150 and the neuron 150 may have other configurations including quantities of inputs and/or quantities of outputs. For example, the neuron 150 may include a plurality of inputs to receive the pixel related values of an image.

FIG. 1B depicts neurons 150 of a neural network 199, in accordance with some example embodiments.

The neural network 199 may include an input layer 160A, one or more hidden layers 160B, and an output layer 160C. Although not shown, other layers may be implemented as well, such as a pooling layer, additional hidden layers, and/or the like. It will be appreciated that the neural network 199 3-2-3 node structure is used to facilitate explanation and, as such, the neural network 199 may be structured in other configurations.

During the training of neural network 199, labeled training data may be provided as an input to the input layer 160A neurons over time (e.g., t, t+1, etc.) until the neural network 199 learns to perform a given task. To illustrate, the neurons 150 of the network 199 may learn by optimizing a mean square error (e.g., between the labeled training data at the input layer 160A and what is generated at the output of the output layer 160C) using gradient descent and/or the like. When the neural network 199 is trained, the neural network's 199 configuration, such as the values of the weights at the hidden layer, activation values, basis function(s), and/or the like, can be saved to storage. The configuration may be saved in the form of vectors, matrixes, tensors, and/or other types of data structures. This saved configuration represents a neural network that can be used to perform a task that the neural network has been trained to do.

The neuron 150 including the neural network 199 may be implemented using code, circuitry, and/or a combination thereof. In some example embodiments, the neuron 150 and/or the neural network 199 (which includes the neurons 150) may be implemented using specialized circuitry including, for example, at least one graphics processing unit (which is configured to better handle parallel processing, matrix operations, and/or the like when compared to a traditional central processing unit) or dedicated neural network circuitry.

Figure 2:
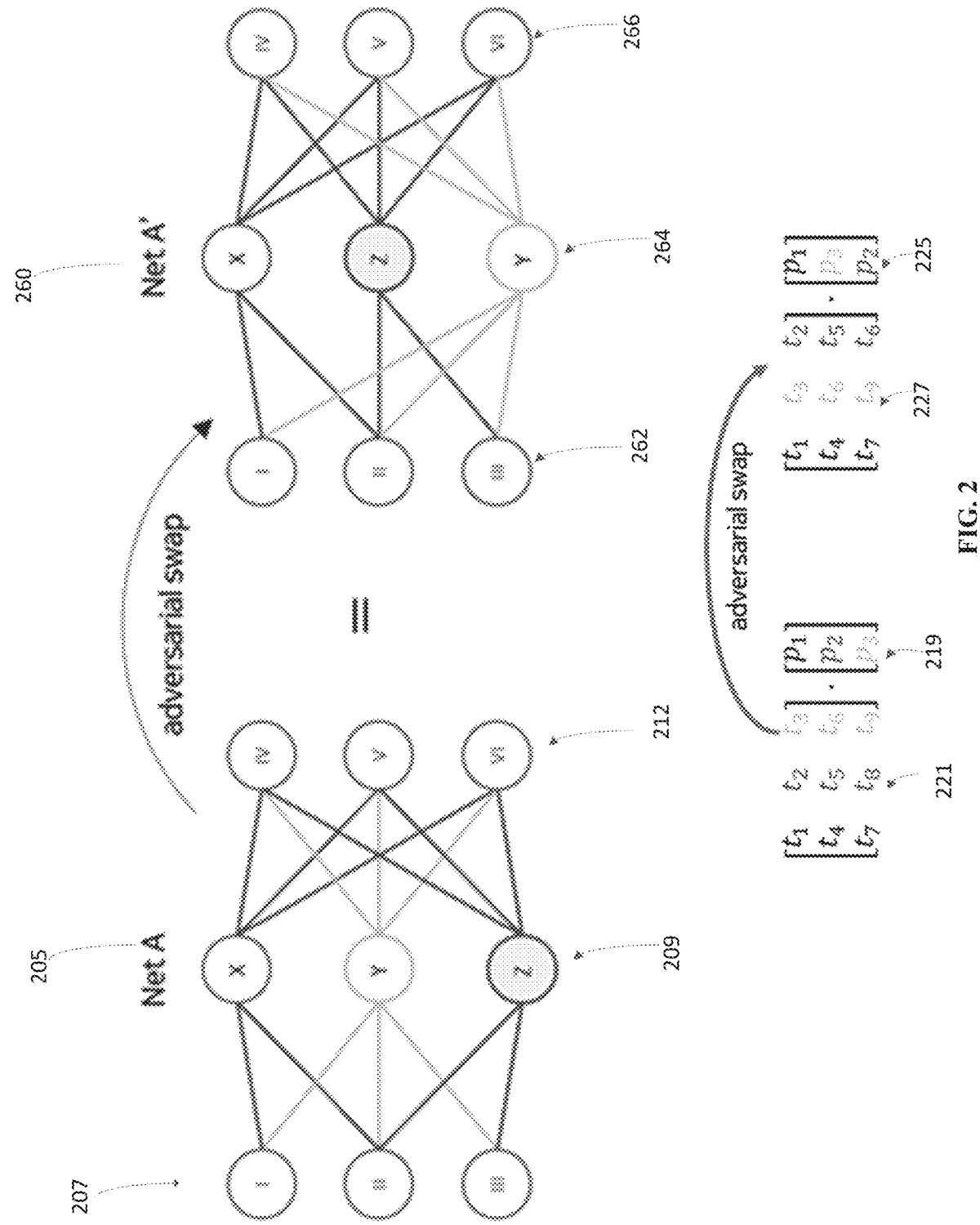
FIG. 2 depicts a neural network and a hacked, copy of the neural network, in accordance with some example embodiments.

FIG. 2 depicts a neural network A 205 (labeled Net A) including an input layer 207, a hidden layer 209, and an output layer 212, each of the layers may include one or more neurons 150. FIG. 2 also depicts neural network A'260 (labeled Net A'), which represents a copy of neural network A 205. For example, the copy neural network A'260 may represent a hacked, unauthorized copy of the neural network 205. In other examples, the neural network may have one or more hidden layers, and the process can be respectively executed in the one or more hidden layers.

In the example of FIG. 2, the neural network A' 260 includes an input layer 262, one or more hidden layers 264, and an output layer 266. The neural network A' 260 has had its hidden layer nodes 264 re-arranged to avoid copy detection. In this example, the hidden layer nodes "Y" and "Z" are re-arranged to avoid copy detection, and the corresponding inputs and outputs to these nodes are also re-arranged as well, without affecting the output accuracy of neural network A' 260, when compared to neural network A 205. In other words, neural network A 205 and neural network A' 260 may provide the same accuracy with respect to, for example, the trained task.

FIG. 2 also depicts the output of the hidden layer nodes x, y, and z 209 given an input 221 applied at 207. These hidden layer nodes may be represented in vector form as $p_1$, $p_2$, and $p_3$ 219. The input 221 applied at 207 may be represented as matrix $(t_1-t_9)$ 221.

FIG. 2 also depicts the outputs of the re-arranged hidden layer nodes x, z, y 264 given an input 227 applied at 262. In the example of FIG. 2, the order of the hidden nodes $p_3$ and $p_2$ 225 has been re-arranged, so the corresponding inputs 227 $(t_3, t_2)$, $(t_6, t_5)$, and $(t_9, t_6)$ have also been re-arranged as noted to avoid detection of the copying while maintaining the accuracy of the re-arranged neural network 260. The hacker may also add a certain amount of noise to the hidden layer nodes 225 to also avoid copy detection.

In some example embodiments, one or more trigger images may be generated for a neural network. Each of the one or more trigger images is configured to activate a certain node of the neural network. In the case of neural network 205 including 3 hidden layer nodes for example, each of the trigger images may be configured to activate one of the hidden layer nodes 209. The use of the term "image" in "trigger image" does not necessarily mean that the data is an image. In other words, a trigger image may be an actual data set of images or it may represent other types of data that are not images.

FIG. 3A depicts an example process for generating one or more trigger images, in accordance with some example embodiments. The description of FIG. 3A also refers to FIGS. 1A and 2.

At 302, one or more of trigger images may be generated for a given neural network, in accordance with some example embodiments. As noted, a trigger image may be generated so that it activates a specific hidden layer node of a neural network. In the case of neural network 205 for example, a one or more of trigger images may be generated, and each of the trigger images may activate (or, e.g., trigger) a specific hidden layer node.

To illustrate further, a first trigger image may be generated to generate an activation layer output (see, e.g., 170 at FIG. 1A) that is a maximum (e.g., a value of about 1) for the first node X of the hidden layer, while not generating a maximum for the other hidden layer nodes Y and Z (e.g., a value of about 0). And, a second trigger image may be generated to generate an activation layer output (see, e.g., 170 at FIG. 1A) that is a maximum (e.g., a value of about 1) for the second node Y of the hidden layer, while not generating a maximum for the other hidden layer nodes X and Z (e.g., a value of about 0) Likewise, a third trigger image may be generated to generate an activation layer output (see, e.g., 170 at FIG. 1A) that is a maximum (e.g., a value of about 1) for the third node Z of the hidden layer, while not generating a maximum for the other hidden layer nodes X and Y (e.g., a value of about 0). In this example, the first, second, and third trigger images activate a specific hidden layer node, while note activating other.

Figure 3B:
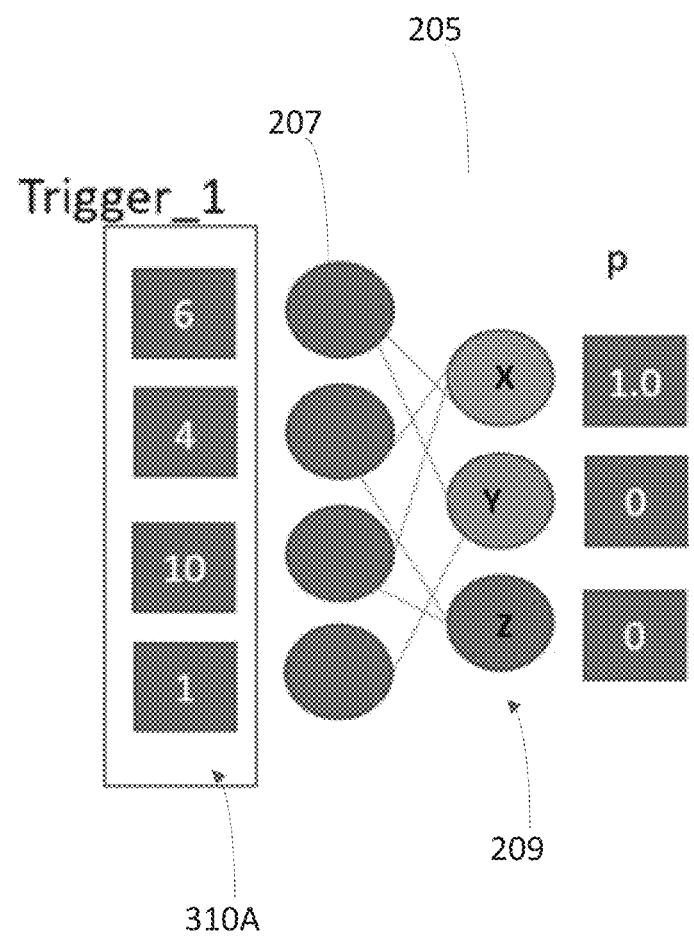
FIG. 3B-FIG. 3C depicts examples of trigger image generation, in accordance with some example embodiments.
Figure 3C:
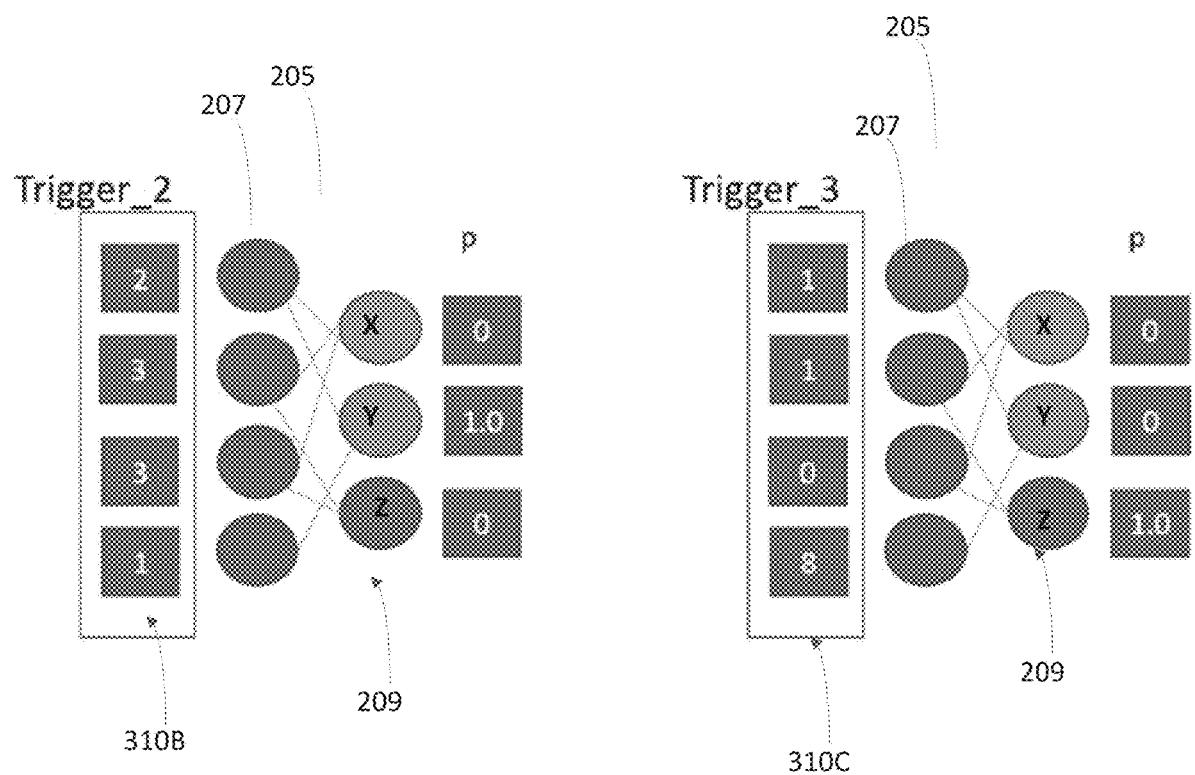

To generate the one or more trigger images for a given neural network, a variety of approaches may be used. In some example embodiments, a neural network may be trained to learn the one or more trigger image. A neural network, such as neural network 205 may be trained to learn the one or more trigger images. FIG. 3B depicts an example of training neural network 205 to learn the first trigger image 310A that activates the first hidden layer node X. For example, weights of the neural network may be fixed with an input image provided as an input at 207 and the desired hidden layer activation outputs of 1, 0, and 0. As noted in the example above, the first trigger image activates the first hidden node layer X, but not nodes Y and Z. The neural networks vary the input image 310A until it converges on a solution (e.g., using gradient descent although other techniques may be used as well). At this point, the input image represents the first trigger image configured to activate hidden layer node X. The second trigger image 106B and third trigger image 310C may be generated in a similar manner as the first trigger image 310A as shown at FIG. 3C.

At 304, the set of one or more trigger images may be saved. Returning to the previous example, the first trigger image, the second trigger image, and the third trigger image may be saved. Moreover, the one or more trigger images may be saved securely to reduce the likelihood of hacking by a potential neural network copyist. In some example embodiments, each neural network being used operationally (e.g., a trained neural network) may have a corresponding set of trigger images, and these trigger images may be stored in secure storage.

Figure 3D:
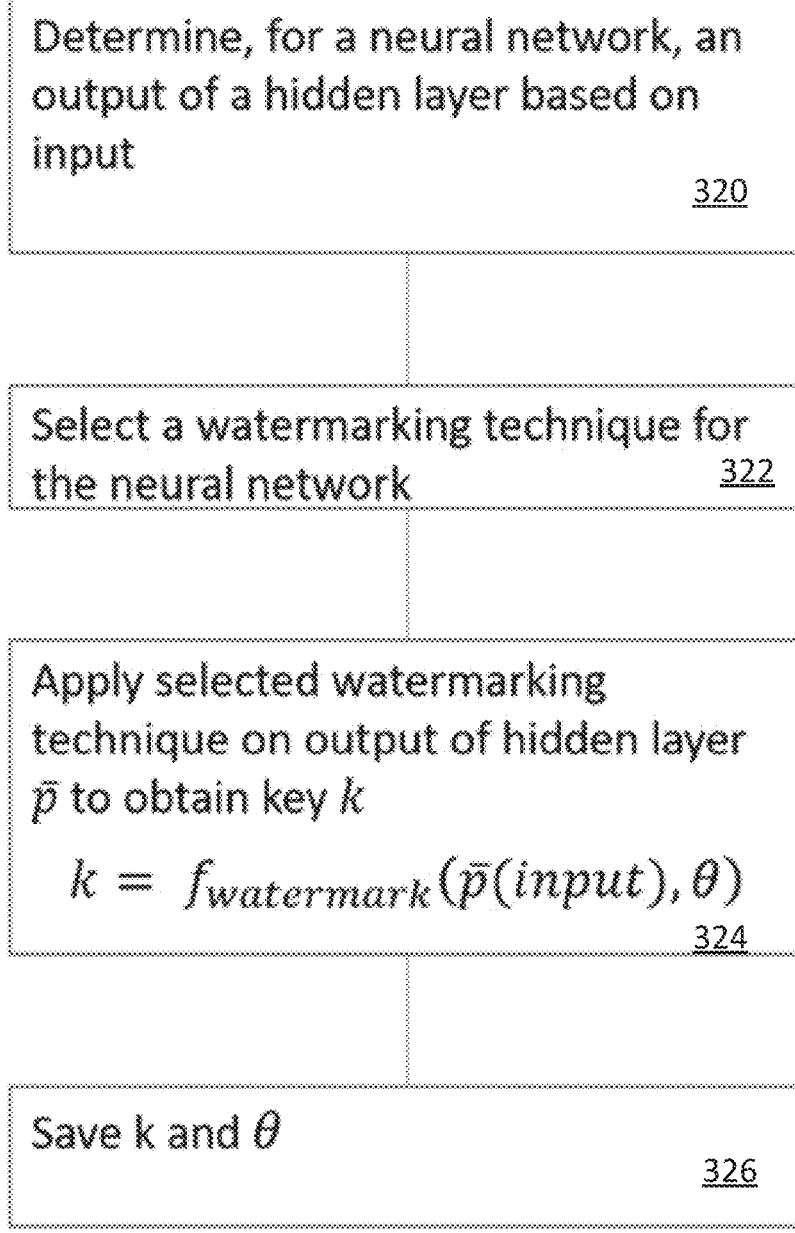
FIG. 3D depicts an example of a process for watermarking, in accordance with some example embodiments.

FIG. 3D depicts an example process for watermarking, in accordance with some example embodiments.

At 320, an output of a hidden layer of a neural network may be determined, in accordance with some example embodiments. For example, an input is applied to the input layer of neural network 205. This input may be an image or any other type of data. The input at 207 may generate an output 205 of hidden layer 209 (e.g., activation outputs 170 of hidden layer nodes). In other examples, the process for the watermarking of a neural network may have one or more hidden layers, and the process can be respectively executed in the one or more hidden layers for one or more hidden layer nodes.

At 322, a watermarking technique may be selected, in accordance with some example embodiments. For example, the watermarking technique may be a random projection (e.g., a vector, matrix, and/or the like of random values), although other watermarking techniques may be selected as well.

At 324, the watermarking technique may be applied on the output of the hidden layer to generate a key, in accordance with some example embodiments. For example, the selected watermarking technique, such as the random projection matrix, may be applied to the output 205 of hidden layer 209 to generate a key. The application of the selected watermarking technique (which may be referred to as θ) may be expressed numerically as follows:

$$k = f_{watermark}(\bar{p}(\text{input}), \theta)$$

wherein k is the key (or watermark) for the hidden layer, θ is the selected watermarking technique which in this example is a random projection, and $\bar{p}(\text{input})$ represents the activation outputs of the hidden layer nodes.

At 326, the generated key for the hidden layer nodes may be saved, in accordance with some example embodiments. Alternatively or additionally, the selected watermarking technique (θ) may be saved as well. In some example embodiments, the generated key and/or the selected watermarking technique (θ) may be saved securely to reduce the likelihood of hacking by a potential neural network copyist. In some example embodiments, each neural network being used operationally (e.g., a trained neural network) may have a corresponding the generated key for the hidden layer and/or the selected watermarking technique (θ) for the hidden layer.

At this stage, the key may serve as a watermark to enable detection of copying of the neural network, such as neural network 205. And, the one or more trigger images may be used to re-order a hidden layer of a candidate neural network being checked for copying using the key.

FIG. 3E depicts an example process for detecting copying of a neural network, in accordance with some example embodiments.

At 330, an output of a hidden layer of a candidate neural network may be determined, in accordance with some example embodiments. For example, an input is applied to the input layer of candidate (also referred to herein as hacked or copied) neural network 260. This input may a test image which is the same or similar to the input at 320. This input at 262 may generate an output 264 of the hidden layer of neural network 260. In other examples, the process for the detecting copying of a neural network may have one or more hidden layers, and the process can be respectively executed in the one or more hidden layers for one or more hidden layer nodes.

Figure 3F:
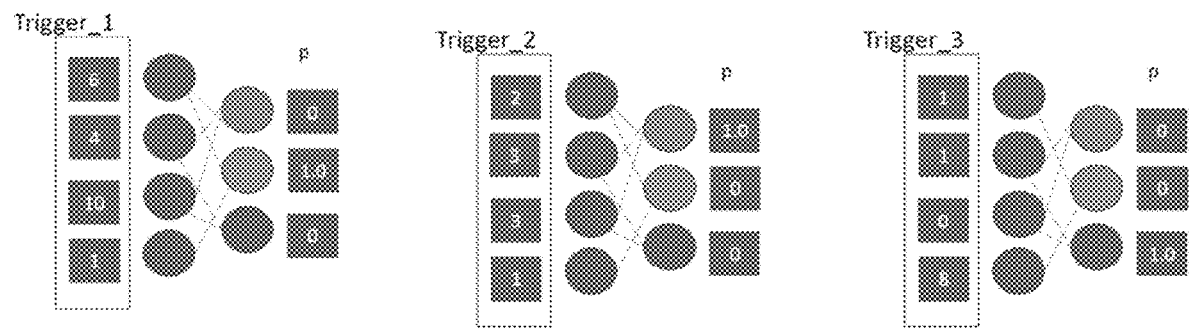
FIG. 3F depicts an example of re-ordering a hidden layer based on trigger images, in accordance with some example embodiments.

At 332, the output of the hidden layer may be re-ordered based on the one or more trigger images, in accordance with some example embodiments. As noted above, the candidate network may have been copied but to avoid copy detection, the hacker may have re-arranged the order of the hidden layer nodes. However, the trigger image may be used to re-order the hidden layer nodes. Referring to the example above having three trigger images, the first trigger image may be applied to the candidate neural network 260. Whatever hidden layer node of neural network 260 has the highest activation output value, that node is identified as the first hidden layer node. Likewise, the second trigger image may be applied to the candidate neural network 260, and whatever hidden layer node of neural network 260 has the highest activation output value, that node is identified as the second hidden layer node. And then the third trigger image may be applied to the candidate neural network 260, and whatever hidden layer node of neural network 260 has the highest activation output value, that node is identified as the third hidden layer node. In this way, the hidden layer nodes of candidate neural network 260 may be re-ordered based on the one or more trigger images. FIG. 3F depicts this previous example in which the first hidden layer node and the second hidden layer node have been swapped. As such, the first trigger image yields a maximum activation value for the middle or second node, while the second trigger image yields a maximum activation value for the first node, so in this example the re-ordering would swap the first hidden node and the second hidden node of network 260 based on the trigger images. The re-ordered hidden layer nodes of candidate network 260 may thus be in the same order as the original network 205. In other examples, the process of FIG. 3F may have one or more hidden layers, and the process can be respectively executed in the one or more hidden layers for one or more hidden layer nodes.

At 334, the watermarking technique may be applied on the output of the hidden layer of the re-ordered candidate network to generate a key, in accordance with some example embodiments. For example, the selected watermarking technique, such as the random projection matrix, may be applied to the output 264 of the hidden layer) which has been re-ordered at 332) of the candidate neural network 260 to generate a key (labeled k re-ordered) The application of the selected watermarking technique (which may be referred to as 0) may be expressed numerically as follows:

$$k^{re\text{-}ordered} = f_{watermark}(\overline{p_{reordered}}, \theta)$$

wherein $k^{re\text{-}ordered}$ is the key (or watermark) for the re-ordered hidden layer, θ is the selected watermarking technique which in this example is a random projection, and $p_{re\text{-}ordered}$ represents the activation outputs of the re-ordered hidden layer nodes.

At 336, the reordered key ($k^{re\text{-}ordered}$) determined at 336 may be compared to the original key saved at 326, in accordance with some example embodiments. If the two keys match, then the candidate neural network 260 has been detected as a copy of neural network 205. If the two keys do not match, then the candidate neural network 260 is likely not a copy of neural network 205.

Although some of the processes described are applied to a hidden layer node, the processes may be applied to detect copying to other layers of a neural network as well.

Although the some of the processes described are applied to a single hidden layer node, the processes may be applied to individually to each of the layers (e.g., a plurality of hidden layers). For example, in another aspect of some example embodiments, a trigger image can cause high activation at more than one hidden layer, and based on the combination of the activations it is possible to find out which neuron is the first neuron. For example, the neural network can have 3 neurons (A, B, C) and the process can have 3 trigger images, then the first trigger image selects neuron A and B (high activation at neuron A and B), the second trigger image selects A and C, and the third trigger image selects B and C. The original neuron A is the neuron that responds with high activation for trigger image #1 and #2, but the activation is low for trigger image #3, i.e. the process can identify the neuron A with the combination of the trigger images.

Figure 4:
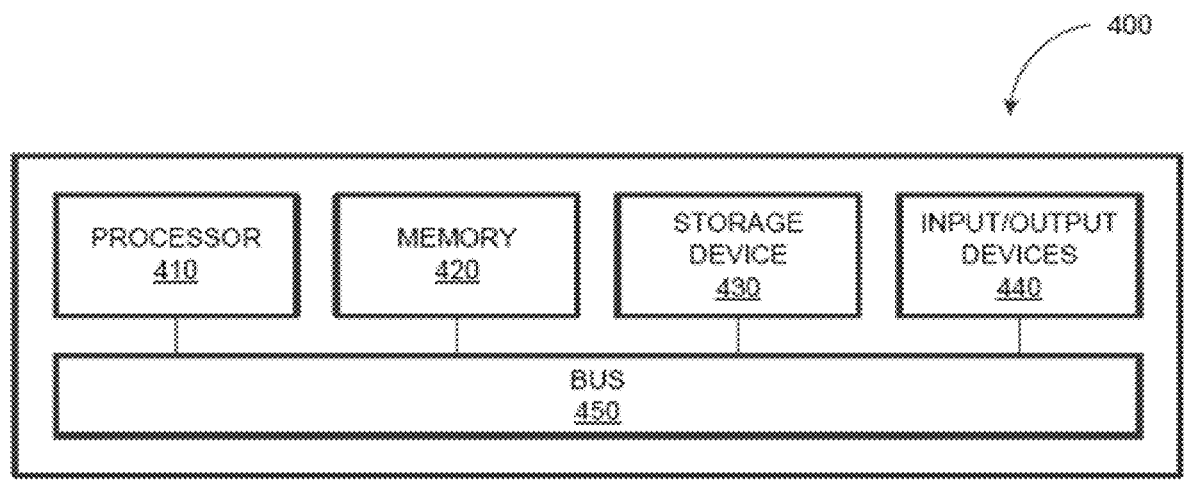
FIG. 4 depicts an example of a computing system, in accordance with some example embodiments.

FIG. 4 depicts a block diagram illustrating a computing system 400, in accordance with some example embodiments. The computing system 400 may be used to implement a server, cloud server, user equipment, IoT (Internet of Things) device, and/or other processor based device where process 300 and/or 399 may be performed to generate watermarks and/or detection of unauthorized copying of a neural network. Further, the system 400 may be used for training, storing, testing, inferencing and/or hosting one or more neural networks and/or wherein the aspects of process 300 and/or 399 may be executed. As shown in FIG. 4, the computing system 400 may include one or more processors or circuitry 410, one or more memory units 420, one or more storage devices 430, and one or more input/output devices 440. The processor 410, the memory 420, the storage device 430, and the input/output devices 440 may be interconnected via a system bus 450. The processor 410 may be capable of processing instructions for execution within the computing system 400. Such executed instructions can implement the operations described herein with respect to process 300 and/or process 399. The processor 410 may be capable of processing instructions stored in the memory 420 and/or on the storage device 430 to display graphical information for a user interface provided via the input/output device 540. The memory 420 may be a computer readable medium such as volatile or non-volatile that stores information within the computing system 400. The memory 420 can store instructions, such as computer program code. The storage device 430 may be capable of providing persistent storage for the computing system 400. The storage device 430 can be a floppy disk device, a hard disk device, an optical disk device, or a tape device, or other suitable persistent storage mechanism. The input/output device 440 provides input/output operations for the computing system 400. In some example embodiments, the input/output device 440 includes a keyboard and/or pointing device. In various implementations, the input/output device 440 includes a display unit for displaying graphical user interfaces. Alternatively or additionally, the input/output device 440 may include wireless and/or wired interface to enable communication with other devices, such as one or more other network nodes, one or more servers, one or more cloud servers, one or more edge computing devices, user equipment, one or more IoT (Internet of Things) devices, and/or other processor based devices. For example, the input/output device 440 can include one or more of an Ethernet interface, a wireless local area network (WLAN) interface, a cellular interface, a short-range wireless interface, a near field wireless interface, and/or other wired and/or wireless interface to allow communications with one or more wired and/or wireless networks and/or devices. Accordingly, the system 400 may include at least one processor; and at least one memory including computer program code; the at least one memory and the computer program code configured to, with the at least one processor, cause the apparatus at least to perform various functions as described herein. Alternatively, the system 400 may include at least one circuitry to cause the apparatus at least to perform various functions as described herein. Accordingly, the system 400 may comprise various means, as described herein, to cause the apparatus at least to perform various functions as described in the application. In some example embodiments the apparatus 400 may be, for example, any type of server, cloud server, edge computing device, user equipment, IoT (Internet of Things) device, vehicle, communication access point, communication network analytics system, communication network management system, base station controller, industrial process management system, antenna system, transmitter, receiver, transceiver, or any combination thereof.

Figure 5:
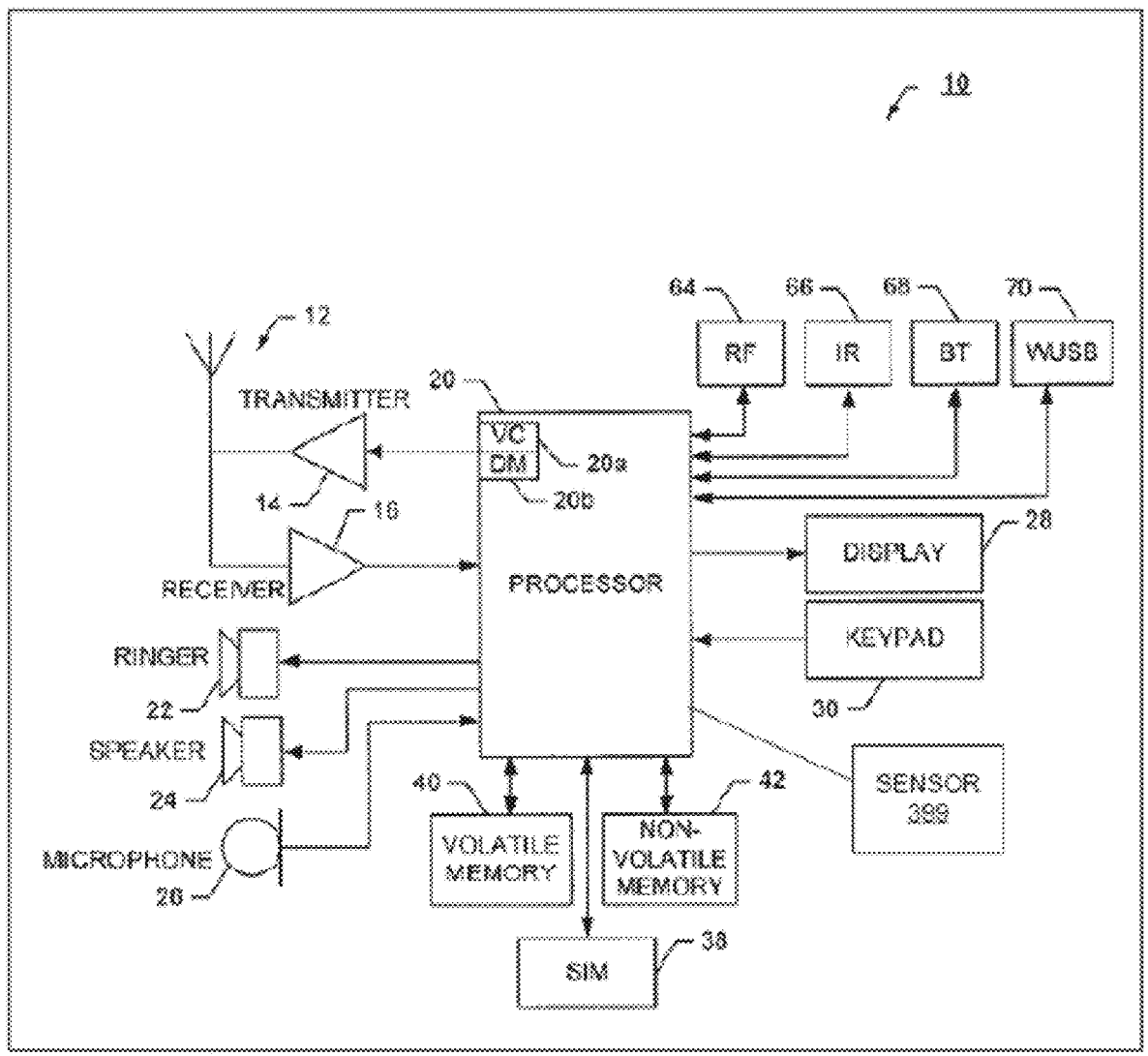
FIG. 5 depicts an example of an apparatus, in accordance with some example embodiments.

FIG. 5 illustrates a block diagram of an apparatus 10, in accordance with some example embodiments The apparatus 10 may represent a user equipment, such as a wireless or wired device where one or more neural networks may be trained, stored, tested, inferenced and/or hosted and/or where aspects of process 300 and/or 399 may be executed. The apparatus 10 may be, for example, any type of mobile terminal, fixed terminal, or portable terminal including a mobile handset, station, unit, device, multimedia computer, multimedia tablet, Internet node, mobile communication device, desktop computer, laptop computer, notebook computer, netbook computer, tablet computer, personal navigation device, personal digital assistants (PDAs), smart watch, sensor device, medical diagnostic device, health or fitness monitoring device, IoT device, audio/video player, digital camera/camcorder, positioning device, television receiver, radio broadcast receiver, electronic book device, game device, television, home appliance device, home access point, network router, drone, vehicle, vehicle infotainment system, vehicle navigation system, vehicle control system, autonomous driving system, autonomous vehicle, or any combination thereof, including the accessories and peripherals of these devices, or any combination thereof.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including one or more circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores. Accordingly, the apparatus 10 may include: at least one processor; and at least one memory including computer program code; the at least one memory and the computer program code configured to, with the at least one processor, cause the apparatus at least to perform various functions as describes herein. Alternatively, the apparatus 10 may include: at least one circuitry to cause the apparatus at least to perform various functions as described herein. Accordingly, the apparatus 10 may comprise various means, as described in the application, to cause the apparatus at least to perform various functions as described herein.

As used in herein, the term "circuitry" may refer to one or more (or all) of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (or, e.g., firmware) for operation, although the software may not be present when it is not in operation (or when not needed for operation). This definition of circuitry applies to all uses of this term herein, including in any of the claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations and functions disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein. For example, the processor 20 may be configured using computer code stored at memory 40 and/or 42 to provide one or more aspects described above including aspects of process 300 and/or 399.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer. Accordingly, the non-transitory computer readable medium may comprise program instructions for causing an apparatus to perform at least the various functions described in the application. Alternatively, the computer program may comprise instructions, or the computer readable medium may comprise program instructions, for causing the apparatus to perform at least the various functions described in the application.

Without in any way limiting the scope, interpretation, or application of the claims appearing below, a technical effect of one or more of the example embodiments disclosed herein may be enhanced detection of neural network copying.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor; and
   at least one memory including computer program code, the at least one memory and the computer program code configured to, with the at least one processor, cause the apparatus to at least:
   determine, for a neural network, an activation layer output by a hidden layer of the neural network;
   apply a selected watermarking process to the activation layer output to generate a key; and
   store, for the neural network to enable detection of copying of the neural network, the selected watermarking process and the key.

2. The apparatus of claim 1, wherein the apparatus is further caused to at least:
   generate, for the neural network, one or more trigger images for one or more nodes of the hidden layer of the neural network; and
   store, for the neural network to enable detection of copying of the neural network, the one or more trigger image for the one or more nodes of the hidden layer of the neural network.

3. The apparatus of claim 1, wherein the apparatus is further caused to at least determine, for a candidate neural network being evaluated for copying, another activation layer output of a corresponding hidden layer of the candidate neural network.

4. The apparatus of claim 3, wherein the apparatus is further caused to at least reorder the one or more nodes of the corresponding hidden layer of the candidate network, the reorder based on the one or more stored trigger images for the one or more nodes of the hidden layer of the neural network.

5. The apparatus of claim 4, wherein a first hidden layer node of the neural network is associated with a first trigger image that causes a maximum activation output at the first hidden layer node but no other nodes of the hidden layer, the reorder based on the maximum activation output.

6. The apparatus of claim 5, wherein the apparatus is further caused to at least apply the stored, selected watermarking process to the other activation layer output of the corresponding hidden layer of the candidate neural network to generate a candidate key.

7. The apparatus of claim 6, wherein the apparatus is further caused to at least:
compare the key to the candidate key;
indicate, based on the comparing, the candidate neural network is a copy, when the key and the candidate key match; and
indicate, based on the comparing, the candidate neural network is not a copy, when the key and the candidate key do not match.

8. The apparatus of claim 7, wherein the candidate neural network is an altered copy of the neural network, the altered copy including reordered hidden layer nodes and/or noise added to the hidden layer nodes.

9. The apparatus of claim 1, wherein the apparatus comprises or is comprised an edge computing device, and/or a communication access point.

10. The apparatus of claim 1, wherein the selected watermarking process comprises a random projection.

11. A method comprising:
determining, for a neural network, an activation layer output by a hidden layer of the neural network;
applying a selected watermarking process to the activation layer output to generate a key; and
storing, for the neural network to enable detection of copying of the neural network, the selected watermarking process and the key.

12. The method of claim 11 further comprising:
generating, for the neural network, one or more trigger images for one or more nodes of the hidden layer of the neural network; and
storing, for the neural network to enable detection of copying of the neural network, the one or more trigger images for one or more nodes of the hidden layer of the neural network.

13. Method of claim 11 further comprising:
determining, for a candidate neural network being evaluated for copying, another activation layer output of a corresponding hidden layer of the candidate neural network.

14. The method of claim 13 further comprising:
reordering the one or more nodes of the corresponding hidden layer of the candidate network, the reorder based on the one or more stored trigger images for the one or more nodes of the hidden layer of the neural network.

15. The method of claim 14, wherein a first hidden layer node of the neural network is associated with a first trigger image causes a maximum activation output at the first hidden layer node but no other nodes of the hidden layer, the reorder based on the maximum activation output.

16. The method of claim 15 further comprising:
applying the stored, selected watermarking process to the other activation layer output of the corresponding hidden layer of the candidate neural network to generate a candidate key.

17. The method of claim 16 further comprising:
comparing the key to the candidate key;
indicating, based on the comparing, the candidate neural network is a copy, when the key and the candidate key match; and
indicating, based on the comparing, the candidate neural network is not a copy, when the key and the candidate key do not match.

18. The method of claim 17, wherein the candidate neural network is an altered copy of the neural network, the altered copy including reordered hidden layer nodes and/or noise added to the hidden layer nodes.

19. The method of claim 11, wherein the selected watermarking process comprises a random projection.

20. A non-transitory computer-readable storage medium including program code which when executed by at least one processor causes operations comprising:
determining, for a neural network, an activation layer output by a hidden layer of the neural network;
applying a selected watermarking process to the activation layer output to generate a key; and
storing, for the neural network to enable detection of copying of the neural network, the selected watermarking process and the key.

* * * * *